United States Patent [19]

Civanlar et al.

[11] Patent Number: 5,253,055
[45] Date of Patent: Oct. 12, 1993

[54] EFFICIENT FREQUENCY SCALABLE VIDEO ENCODING WITH COEFFICIENT SELECTION

[75] Inventors: Mehmet R. Civanlar, Red Bank, N.J.; Atul Puri, Riverdale, N.Y.

[73] Assignee: AT&T Bell Laboratories, Murray Hill, N.J.

[21] Appl. No.: 908,134

[22] Filed: Jul. 2, 1992

[51] Int. Cl.$^5$ .................. H04N 7/133; H04N 7/137
[52] U.S. Cl. .................. 358/133; 358/135; 358/136
[58] Field of Search .................. 358/133, 135, 136

[56] References Cited

U.S. PATENT DOCUMENTS

| | | | |
|---|---|---|---|
| 4,707,738 | 11/1987 | Ferre et al. | 358/136 |
| 4,821,119 | 4/1989 | Gharavi | 358/136 |
| 4,984,076 | 1/1991 | Watanabe et al. | 358/133 |
| 4,999,705 | 3/1991 | Puri | 358/136 |
| 5,001,561 | 3/1991 | Haskell et al. | 358/133 |
| 5,006,931 | 1/1991 | Shirota | 358/133 |
| 5,045,938 | 9/1991 | Sugiyama | 358/133 |
| 5,063,608 | 11/1991 | Siegel | 358/133 |
| 5,073,820 | 12/1991 | Nakagawa et.al. | 358/133 |
| 5,107,345 | 4/1992 | Lee | 358/136 |

OTHER PUBLICATIONS

International Standards Organization Committee Draft 11172-2, "Coding of Moving Pictures and Associated Audio for Digital Storage Media at up to about 1.5 Mbit/s," Nov. 1991.

"Video Coding Using the MPEG-1 Compression Standard," A. Puri, Proceedings of the Society for Information Display 92, May 1992, Boston.

Primary Examiner—Tommy Chin
Assistant Examiner—Richard Lee
Attorney, Agent, or Firm—Robert P. Marley

[57] ABSTRACT

An improved technique for efficient frequency scaling wherein the number of coefficients to be included in each sub-block is selectable, and a code indicating the number of coefficients within each layer is inserted in the bitstream at the beginning of each encoded video sequence. This technique allows the original runs of zero coefficients in the highest resolution layer to remain intact by forming a sub-block for each scale from a selected number of coefficients along a continuous scan. These sub-blocks may be decoded in a standard fashion, with an inverse discrete cosine transform applied to square sub-blocks obtained by the appropriate zero padding of and/or discarding of excess coefficients from each of the scales. This technique further improves coding efficiency by allowing an implicit end of block signal to separate blocks, making it unnecessary to transmit an explicit end of block signal in most cases.

9 Claims, 6 Drawing Sheets

EFFICIENT FREQUENCY SCALABLE VIDEO ENCODING WITH COEFFICIENT SELECTION

TECHNICAL FIELD

The invention relates to the encoding of video signals, and more particularly, encoding video signals in an efficient manner which permits images having a wide range of resolutions to be derived from an encoded video signal.

BACKGROUND OF THE INVENTION

Many applications, such as, multi-point video teleconferencing, the windowing of displays for workstations, video communications on asynchronous transfer mode ("ATM") networks, and broadcast high-definition television can benefit if video at various resolutions can be derived from an encoded bitstream. The simplest method of achieving this is the simulcast technique in which multiple independent coded replicas of a video sequence (each sealed to a different resolution) are simultaneously transmitted. In this approach, scaling is performed prior to the compression/decompression of each replica, and each resolution scale is then independently encoded and assigned a portion of the total available transmission bandwidth. As a result of his independent encoding and transmission, the simulcast technique requires a wide bandwidth.

A more bandwidth efficient alternative to simulcasting, is scalable video encoding. Frequency scaling is a low-complexity method of scalable video encoding in which a single video signal is transmitted to multiple receivers which decode images of varying resolutions from that signal depending upon the particular signal decoding scheme employed by each receiver. A specific encoding method to which frequency scaling can be easily applied uses discrete cosine transform ("DCT") blocks of original or prediction error pixels to derive blocks of frequency domain coefficients. Various subsets of these frequency domain coefficients can be used to generate different resolution scales for a given image. Such encoding may be implemented using a slightly modified version of the encoders disclosed in the International Standards Organization Committee Draft 11172-2, "Coding of Moving Pictures and Associated Audio for Digital Storage Media at up to about 1.5 Mbit/s," November 1991, and in "Video Coding Using the MPEG-1 Compression Standard," A. Puri, Proceedings of the Society for Information Display 92, May 1992, Boston.

The transform coding portion of these encoders computes the DCT as a function of the energy in the blocks it receives from an original image, or from the difference between the original and its prediction from a previously decoded image. Assuming an 8×8 picture element ("pixel") basic block size, each 8×8 pixel block of a picture is transformed into an 8×8 block of DCT coefficients. These coefficients are then quantized and scanned so that they may be converted into a one dimensional sequence. An entropy coder within the video encoder compresses the one dimensional sequence to a series of number pairs called run/levels. Within a run/level the first number represents the number of zero coefficients between the last two non-zero coefficients in the one dimensional sequence, and the second number represents the quantized value (i.e., quantization index) of the next non-zero coefficient in that sequence. The number of zero coefficients is called the length of "run of zeros". For example, the one dimensional sequence of quantized coefficients 1 1 0 0 5 0 0 0 6 3 0 0 4 0 0 0 ... 0 results in the run/level sequence of (0, 1) (0, 1) (2, 5) (3,6) (0, 3) (2, 4) (EOB). EOB, or End-of-Block, indicates that all of the remaining quantized coefficients are zeros. Prior to transmission, these pairs, including the (EOB), are encoded using variable-length codes ("VLCs") consisting of a sequence of binary digits obtained from a code table which is optimized to assign shorter codes to most frequent pairs occurring in typical video images. This way, long runs of zeros (which are common in motion compensated transform based image coding) can be efficiently coded. When the transmitted signal is received, or stored signal is retrieved, the VLCs are decoded and the run/level pairs are recovered. The non-zero quantized coefficients are then inverse quantized, the zero coefficients are reconstituted, and an inverse DCT ("IDCT") is performed on the entire block.

Frequency scaling allows for efficient encoding of video in a manner which facilitates the derivation of various resolutions at the decoder by using different IDCT block sizes. It can be shown that if a decoder applies the IDCT to an upper left corner sub-block of every received block of coefficients, it can generate lower resolution images. For example, if a 2×2 sub-block of an encoded 8×8 block is decoded, image resolution will be reduced by a factor of four both vertically and horizontally (referred to as f-scale 2 frequency scaling). In this manner, the frequency scalability can be implemented on the decoder without any modification to the encoder. However, because of the VLCs used for coding run/level pairs, there is no way to detect the end of a block (EOB), or the beginning of a new block, unless the entire block is decoded. As a result, in order to recover a sub-block, the variable-length word decoder must operate as though a full resolution image were being recovered (this requires very fast, expensive circuitry to be used to decode even low resolution images). Using unique marker codes to separate sub-blocks is not feasible because of the high overhead caused by such codes.

An existing method for obtaining a frequency scalable bitstream is to encode the coefficients from sun-blocks separately in a layered structure and multiplex them as slices of various layers in the bitstream. In this method, the lowest resolution layer keeps the basic structure of the bitstream hierarchy, but fewer DCT coefficients are included with each block (such as four coefficients for f-scale 2). The remaining coefficients for each block in the slice are sent in slave slices which are separated by independently identifiable bit patterns called slave slice start codes. One problem with this approach is that every coded block in each scale has an EOB associated with it to mark the last non-zero coefficient included in that scale. As a result, instead of sending a single EOB for each coded block as in non-scalable coding, multiple EOBs are sent which decreases the efficiency of the frequency scalable coding.

Another problem with this solution is the overhead it introduces over and above the overhead caused by the slave slice start codes. The arrows in FIG. 1A shows a typical zigzag scan of an 8×8 coefficient block (100), where each of the numbers corresponds to the location of the coefficient in the one dimensional sequence derived by the scan operation. FIG. 1B shows the zig-zag scanning pattern applied to 2×2 (101), 4×4 (103), and 8×8 (103) coefficient sub-blocks used with f-scale 2, f-scale 4, and f-scale 8 layers respectively. If coefficients 3 and 4 are zeros, they will be coded as part of a single run of zeros within the bitstream if the 8×8 block is scanned as a whole (FIG. 1A). However, in existing methods of frequency scalable block encoding they must be coded separately as they are each in a different coefficient sub-block. While there are only three such breaks associated with an f-scale 2 sub-block (between the coefficients within the solid-line ovals of FIG. 1B), there are seven associated with an f-scale 4 sub-block (between the coefficients within the dotted-line ovals). Each break in a run of zeros introduced by the sub-block divisions leads to increased coding overhead. While this overhead may be reduced by using separate VLC tables optimized for each frequency scale, these separate tables introduce additional complexity.

SUMMARY OF THE INVENTION

The aforementioned problems are solved, in accordance with the principles of the invention, by employing an efficient frequency scaling technique wherein the number of coefficients to be included in each sub-block is selectable, and a code indicating the number of coefficients within each layer is inserted in the bitstream at the beginning of each encoded video sequence. This technique allows the original runs of zero coefficients in the highest resolution layer to remain intact by forming a sub-block for each scale from a selected number of coefficients along a continuous scan. These sub-blocks may be decoded in a standard fashion, with an IDCT applied to square sub-blocks obtained by the appropriate zero padding of and/or discarding of excess coefficients from each of the scales. Since the original level/run statistics are not changed by this method, the original VLC tables can be used to encode/decode all video layers derived from the sub-blocks. This invention further improves coding efficiency by allowing an implicit EOB to separate blocks, making it unnecessary to transmit an explicit EOB signal in most cases.

DETAILED DESCRIPTION

Figure 1A:
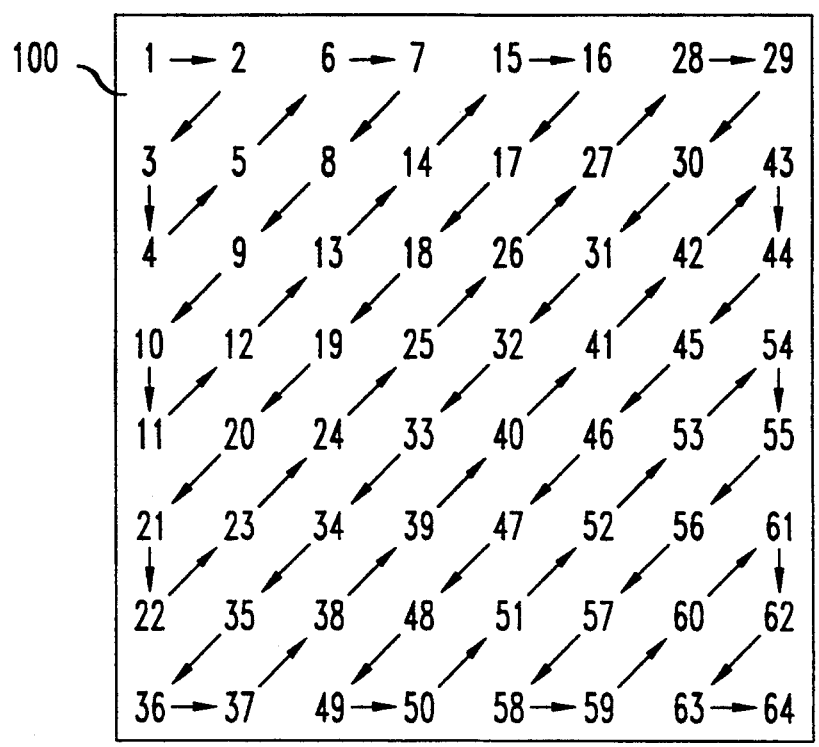
FIG. 1A is an illustration of a zigzag scanning of coefficients within an 8×8 block.
Figure 1B:
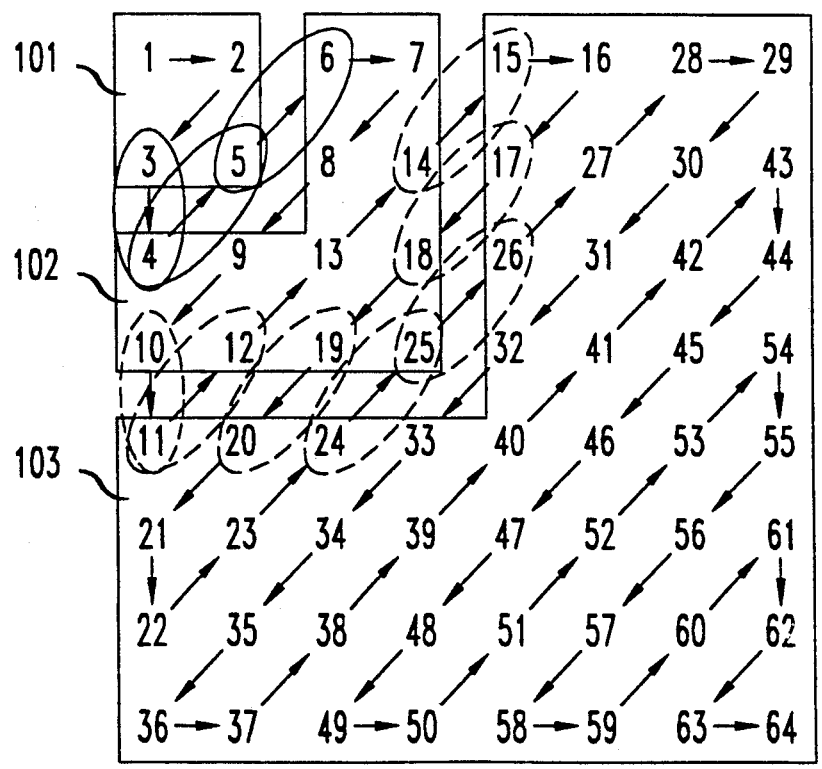
FIG. 1B is an illustration of a zig-zag scanning of coefficients within 2×2, 4×4, and 8×8 sub-blocks.
Figure 2A:
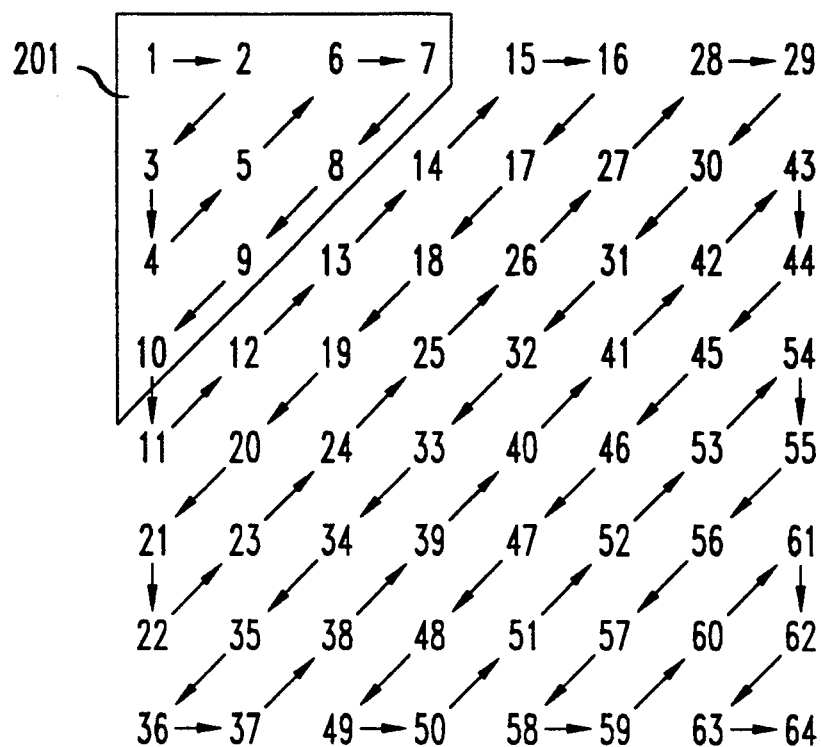
FIG. 2A is an illustration of the coefficient selection technique of the invention applied along a zig-zag scan to a portion of a 4×4 sub-block of an 8×8 block.
Figure 2B:
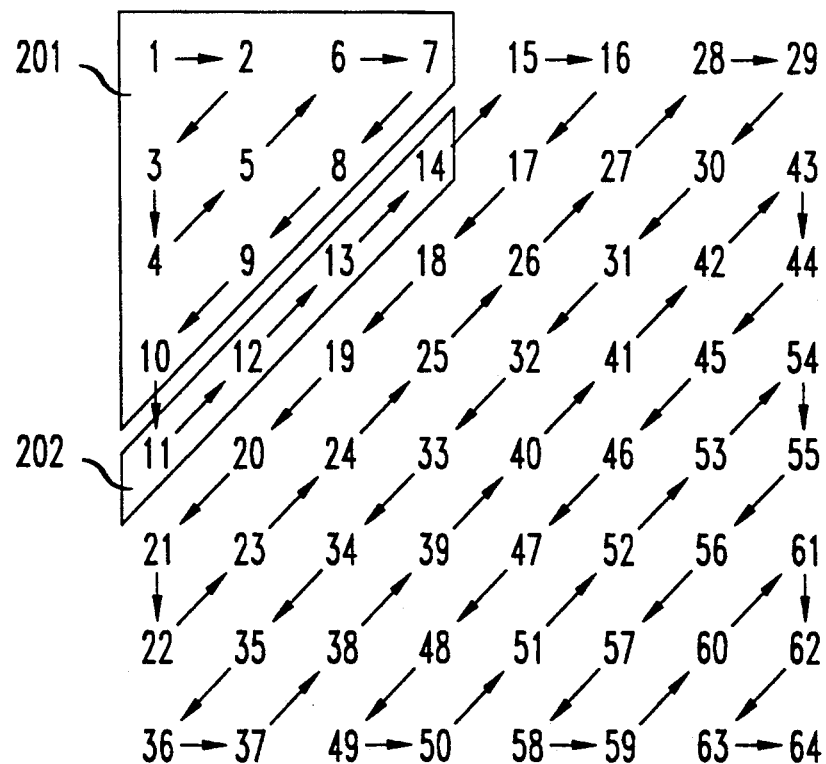
FIG. 2B is an illustration of the coefficient selection technique of the invention applied along a zig-zag scan to a 4×4 sub-block and a portion of an 8×8 block.

FIG. 2A shows an example of the adaptive coefficient selection technique of the invention applied along a zig-zag scan to a portion of a 4×4 sub-block of an 8×8 block. The number of coefficients to be included in each layer is selectable, and the desired number of coefficients for each layer is included at the beginning of each video sequence. In the particular example illustrated in FIG. 2A, the zigzag scan pattern is such that if the selected number of coefficients for the f-scale 4 layer is 10 or less (see coefficient group 201), the selected coefficients will correspond to a subset of the coefficients usually contained within a 4×4 sub-block. For groupings of coefficients larger than 10, some coefficients from the f-scale 8 layer would be included. For example, as shown in FIG. 2B, a grouping of 14 coefficients would include the coefficients within groups 201 and 202, and coefficient number 11 within group 202 would usually be included in an f-scale 8 layer. Such "extra" coefficients may be ignored by decoders which decode only f-scale 4, as such decoders employ a 4×4 IDCT on the 4×4 upper left corner sub-block. For frequency scalable decoders that may decode images at higher resolutions, the extra coefficients are necessary to decode layers corresponding to the higher resolutions.

The invention minimizes overhead as it does not require the insertion of additional EOBs in every coded sub-block of every scale to partition the coefficients within each layer. Overhead is minimized by implementing the following coding guidelines. If the last coefficient of a set of coefficients in a given layer is non-zero, no EOB is necessary as the decoder can always determine end of a sub-block by counting the number of coefficients decoded (the number of coefficients in each layer is included at the beginning of each video sequence). If the last coefficient of a set of coefficients in a given layer is zero, and falls within a run of zeros, the whole run including the first non-zero coefficient following it is included in that layer (provided it can be encoded/decoded by the lower layer VLC table). The "extra" coefficients included in the current resolution layer are ignored by low resolution decoders, and used in decoding corresponding higher resolution layers by scalable or high resolution decoders. The inclusion of the "extra" coefficients simply reduces the run/level pairs included in the next higher resolution layers by one (corresponding to the one extra run/level pair included in the lower resolution layer). There is no net increase in overhead. Finally, if all coefficients after a non-zero coefficient are zero, but the run/level event generated cannot be encoded/decoded by the lower level VLC table, then an EOB is used once.

Figure 3:
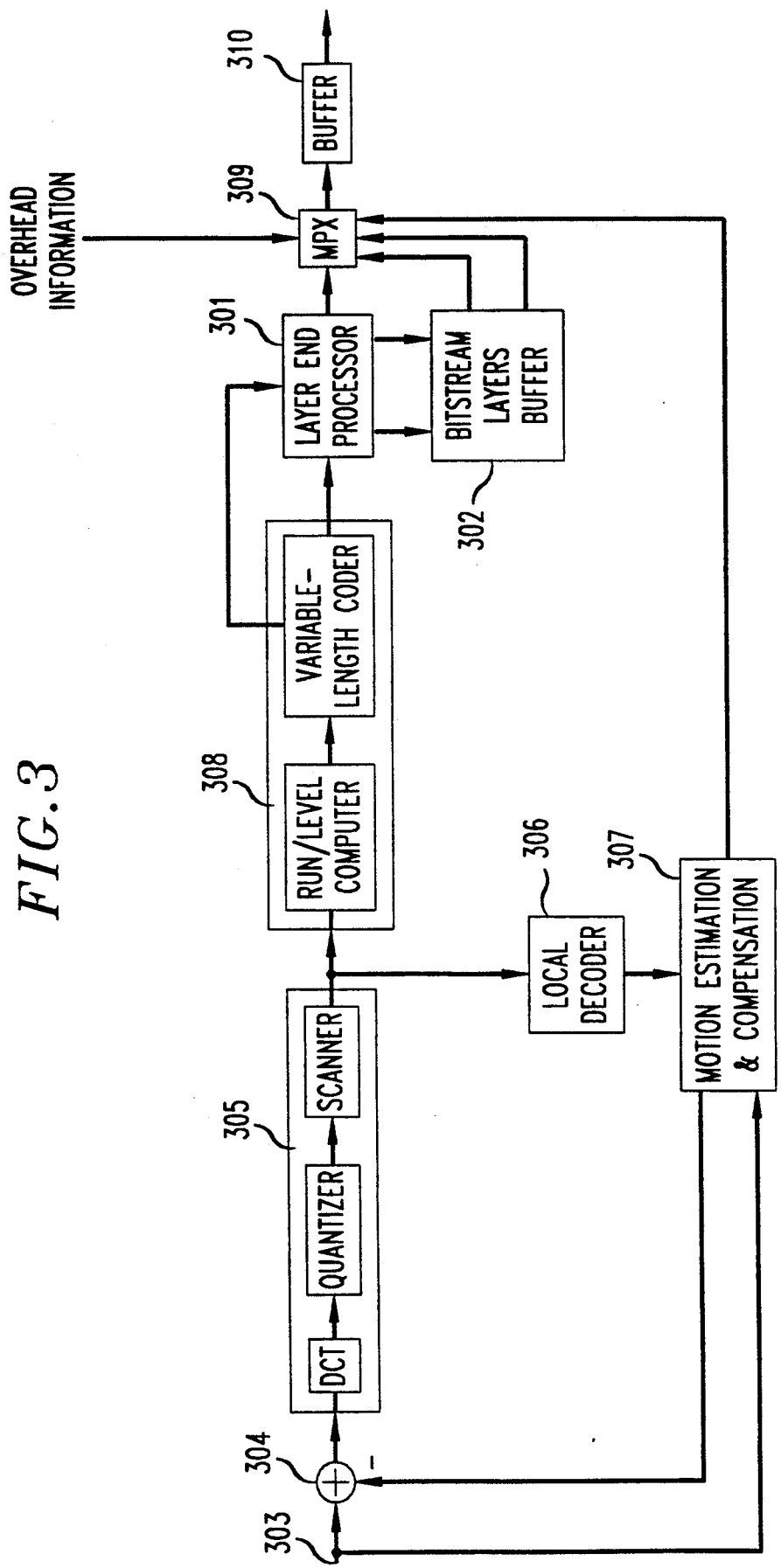
FIG. 3 is a simplified block diagram of an encoder for implementing frequency scaling with scan based coefficient selection in accordance with a particular embodiment of the invention.

FIG. 3 shows a simplified block diagram of an encoder for implementing frequency scaling with coefficient selection. The encoder is similar to those disclosed in the International Standards Organization Committee Draft 11172-2, and in "Video Coding Using the MPEG-1 Compression Standard," but includes layer end processor 301 and bitstream layers buffer 302 to facilitate splitting the coefficients into layers. An image block is input on line 303 and passes through differencing element 304 to transform coder 305. Within transform coder 305 a DCT is performed on the image signal, and the resulting coefficients are quantized and scanned. The scanned coefficients are decoded by local decoder 306 and passed to motion estimation and compensation circuitry 307. Motion estimation and compensation circuitry 307 calculates a prediction of the image block input to line 303 based upon the best match of the block to blocks in a previously decoded image received from local decoder 306. This estimate is differenced from the incoming image signal via differencing element 304. Motion estimation and compensation circuitry 307 also outputs motion vectors which form a portion of the overhead information associated with the block being encoded. The output of transform coder 305 is also passed to entropy coder 308, where run/levels are computed and variable-length coding is performed. All of the above described encoding operations are well known in the art and discussed in the two references referred to earlier.

Run/level data and a variable-length encoded bitstream are output by entropy coder 308 to layer end processor 301. Layer end processor 301 counts the number of coefficients and routes the VLCs to corresponding layers according to the guidelines of the invention described above. The beginning of each slice is marked within the bitstream by a slice start code or a slave slice start code (depending upon the frequency scale). Codes allocated to the lowest resolution layer are directly sent to the multiplexer to be inserted in the bitstream. Each code which belong to higher resolution layers are stored bitstream layers buffer 302. At the beginning of all but the lowest frequency layer slice, a slave slice start code is inserted in the bitstream by multiplexer ("MPX") 309. This code is followed by any coded data for this frequency scale contained in bitstream layers buffer 302. This ordering of frequency scale slices for each layer is repeated until the highest resolution slave slice is included in the bitstream. The process is repeated for all slices in each picture. Multiplexer 309 outputs the encoded bitstream and overhead codes to buffer 310. The overhead codes include an indication of the number of coefficients in each layer, which is generated by an independent processor (not shown in FIG. 3) and inserted by MPX 309 at the beginning of each video sequence. Buffer 310 transmits the bitstream at the appropriate rate to a decoder or a storage device.

Figure 4:
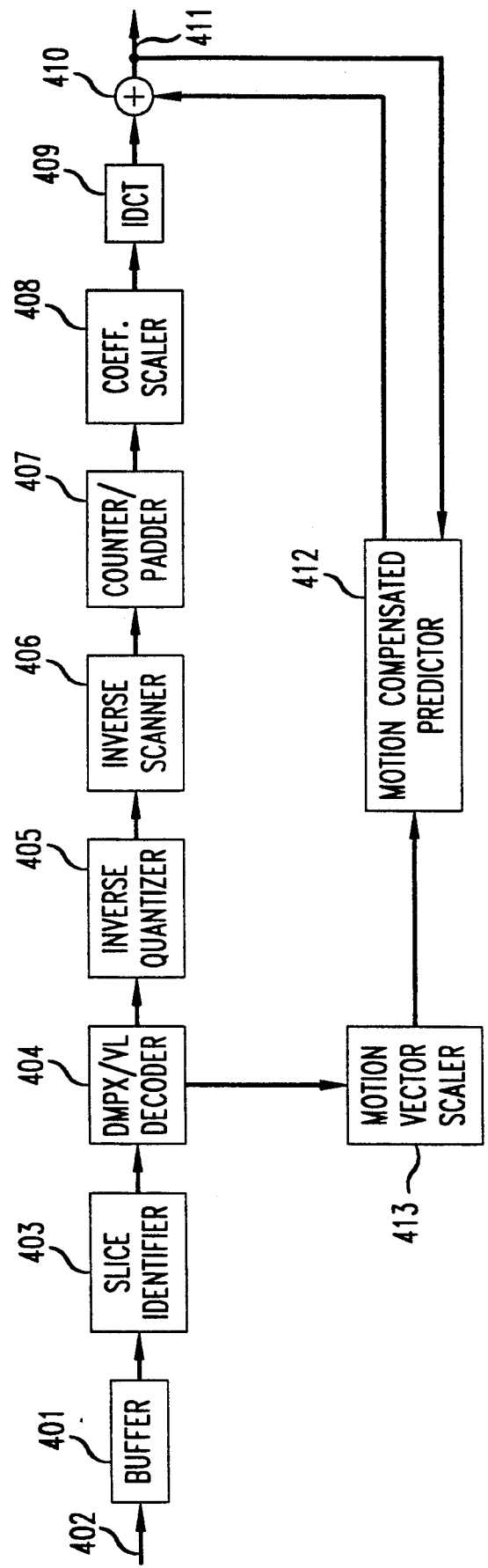
FIG. 4 is a simplified block diagram of a decoder capable of decoding the resolution layer corresponding to the lowest frequency scale from the bitstream output by the encoder of FIG. 3.

FIG. 4 is a simplified block diagram of an arrangement for decoding the lowest resolution layer from the bitstream output by the encoder of FIG. 3. The encoded bitstream is input to buffer 401 via line 402. Buffer 402 passes the bitstream to slice-identifier 403 which scans the bitstream for slice start codes and slave slice start codes. Slice identifier 403 passes the portion of the bitstream between the slice-start-code and the first slave-slice-start-code to demultiplexer/variable-length decoder ("DMPX/VL decoder") 404. As this decoder is only concerned with the lowest (and first) encoded layer of video this is the only portion of the bitstream which need be decoded. DMPX/VL decoder 404 demultiplexes and decodes the received portion of the bitstream to obtain quantized DCT coefficients. These coefficients are processed by inverse quantizer 405 and inverse scanner 406, which perform the inverse function of the scanner and quantizer of transform coder 305 (FIG. 3). The coefficients are then counted, and additional coefficients of zero are inserted to form square blocks by coefficient counter/padder 407 (square blocks are required for performing an IDCT). Since the coefficients used with smaller size IDCTs must be scaled, coefficient scaling is performed on the block by coefficient scaler 408 before an IDCT is performed by IDCT circuit 409. The video blocks output by IDCT circuit 409 are passed through summing element 410, where a predicted image may be added to them, prior to output on line 411. As is shown in FIG. 4, the predicted image is produced by motion compensated predictor 412. Motion compensated predictor 412 generates this predicted image as a function of scaled motion vectors received from motion vector scaler 413, and the video blocks output on line 411. Scaling is needed because the motion vectors are derived for the highest resolution scale and their values must be adjusted for the current, lower resolution scale.

Figure 5:
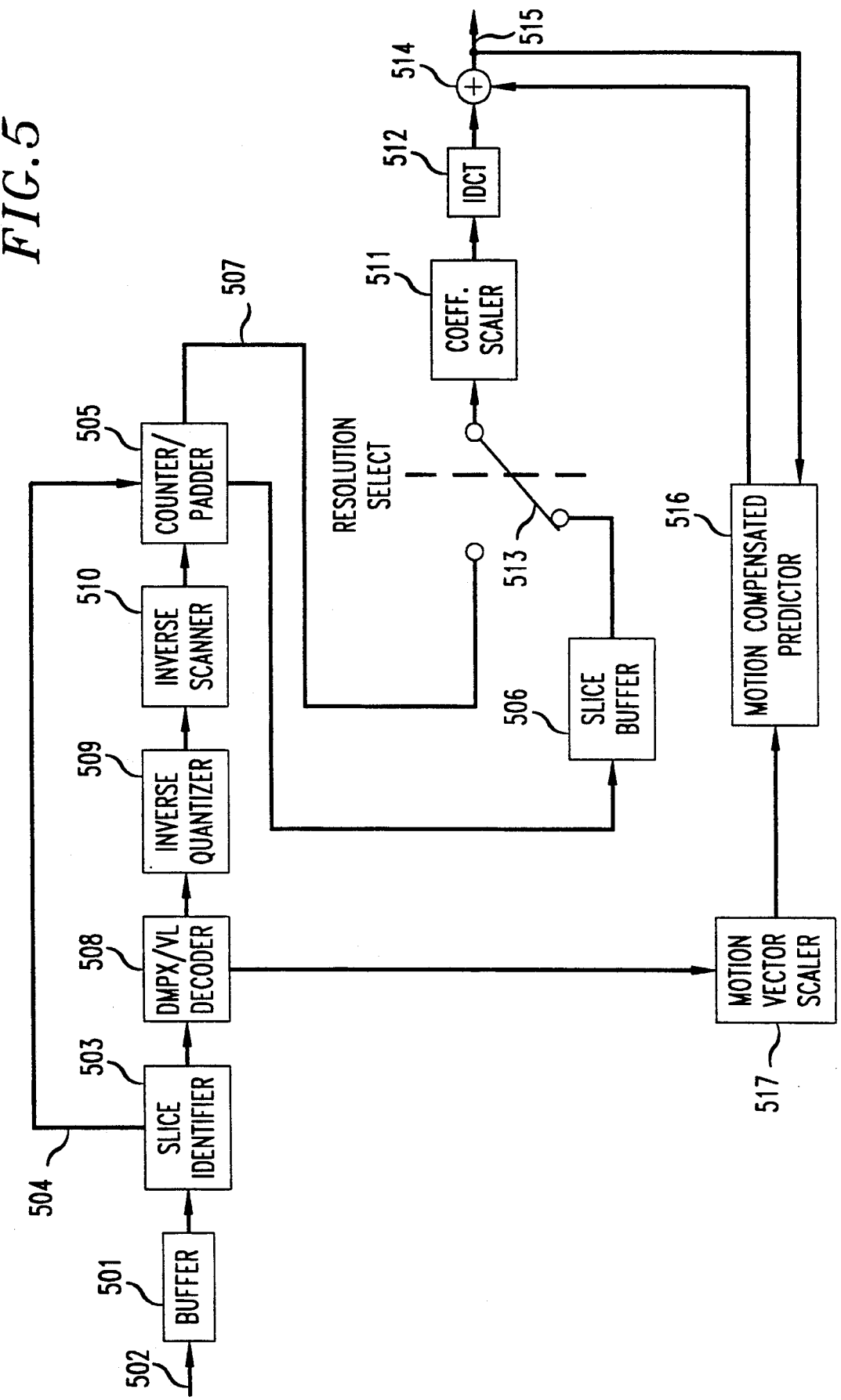
FIG. 5 is a simplified block diagram of a decoder capable of decoding two resolution layers corresponding to two frequency scales.

FIG. 5 shows a simplified block diagram of a decoder capable of decoding two scalable resolution layers. The encoded bitstream is input to buffer 501 via line 502. Buffer 501 passes the bitstream to slice-identifier 503 which scans the bitstream for slice start codes and slave slice start codes. Upon detecting a slice start code, slice identifier 503 sends a control signal, via line 504, which directs the output of coefficient counter/padder 505 to slice buffer 506. Upon detecting a slave slice start code, slice identifier 503 sends a control signal, via line 504, which directs the output of coefficient counter/padder 505 to line 507. This insures that the low resolution layer coefficients will be passed to slice buffer 506 for storage, so that they may be appropriately combined with coefficients from the higher resolution slave slice which is received after the low resolution layer.

The bitstream is passed from slice identifier 503 to DMPX/VL decoder 508, where it is demultiplexed and decoded to obtain quantized DCT coefficients. These coefficients are then processed by inverse quantizer 509 and inverse scanner 510. The coefficients are counted, and additional coefficients of zero are inserted to form square block by coefficient counter/padder 505 (square blocks are required for performing an IDCT). If this is a low resolution layer, coefficient counter/padder 505 passes the coefficients to slice buffer 506; otherwise coefficient counter/padder 505 outputs the coefficients on line 507. Slice buffer 506 allows the low resolution coefficients to be held while the high resolution coefficients are decoded. The coefficients are passed from slice buffer 506 and/or line 507 to coefficient scaler 511 and IDCT circuit 512 via resolution select switch 513. The position of resolution select switch is controlled by an independent processor not shown in FIG. 5. The video blocks output by IDCT circuit 512 are passed through summing element 514, where a predicted image may be added to them, prior to output on line 515. Motion compensated predictor 516 generates this predicted image as a function of scaled motion vectors received from motion vector scaler 517, and the video blocks output on line 515.

In certain applications, different VLC tables may have to be employed for each different video layer. Since the possible run lengths for the lower resolution layers are shorter than that of the high resolution layers, it is possible to use shorter VLC tables for the lower resolution layers. This may reduce the required computational resources and memory required to facilitate the video decoding. Also, in certain applications a separate quantizer may be utilized for each video scale to allow independent quality adjustments corresponding to bit rates of each layer.

Figure 6:
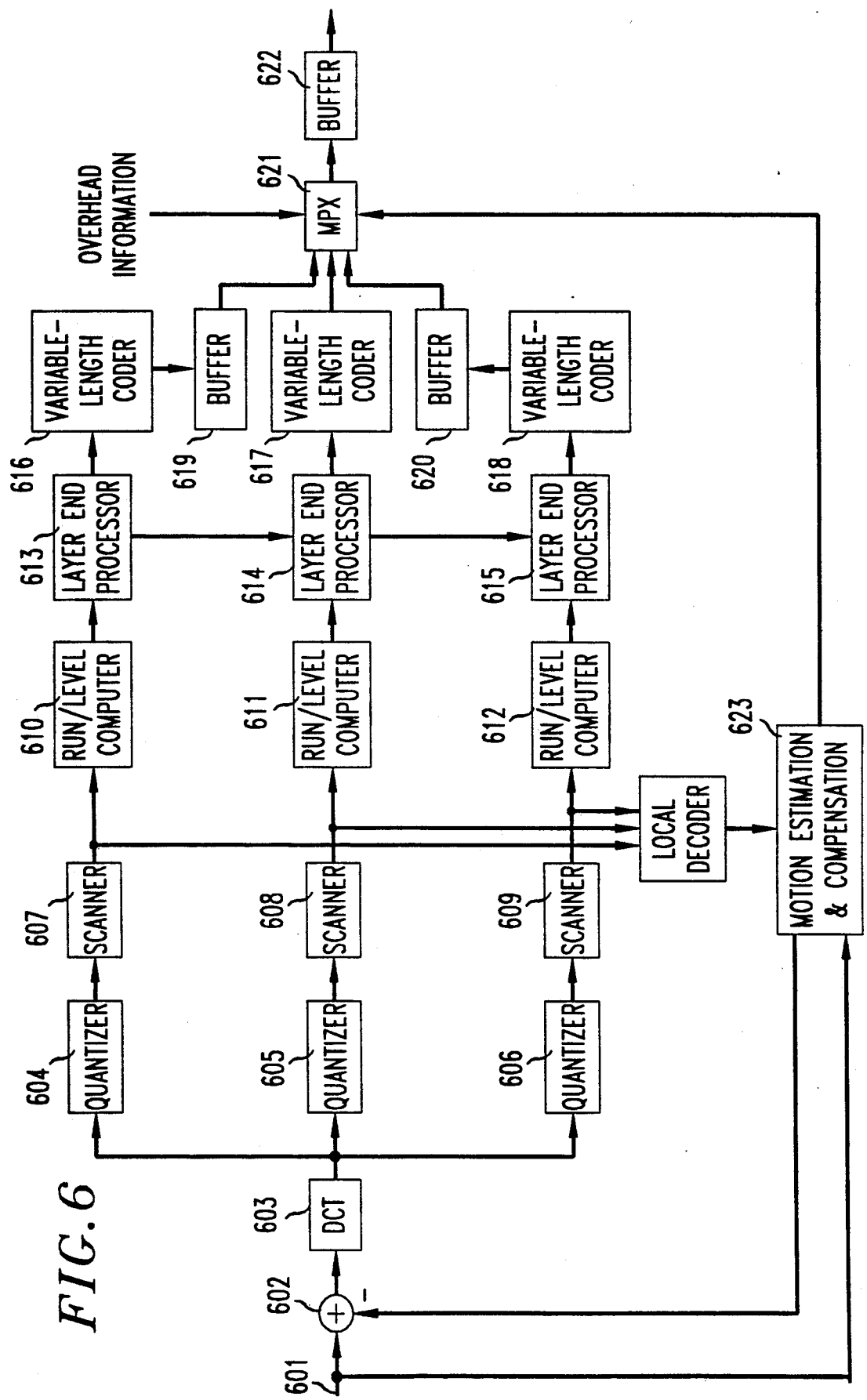
FIG. 6 is a simplified block diagram of an implementation of the invention wherein each video layer is encoded via a dedicated quantizer, scanner, and variable-length coder.

FIG. 6 shows an encoder implementation, which is similar in operation to the encoder of FIG. 3, but wherein each layer in encoded via a dedicated quantizer and variable-length coder. In this particular implementation, image blocks are input on line 601 to differencing element 602 and passed to DCT circuit 603 where a DCT is performed. All of the coefficients output by DCT circuit 603 are then passed to three separate quantizers (604, 605, and 606), three separate scanners (607, 608, and 609), three separate run/level computers (610, 611, and 612), three separate layer end processors (613, 614, and 615), and three separate variable-length coders (616, 617, and 618). The layer end processors are interconnected so that the layer end processors facilitating the encoding of the lower layers may pass information to higher resolution layer end processors as to the actual number of coefficients which need be included in each layer sub-block. Coefficients that actually belong in a higher resolution layer, but are included in a lower resolution layer so as not to break a run of zeros, are coded with the lower resolution layer. The variable-length coders for the intermediate (617) and highest (618) resolution layers output bitstreams to buffers 619 and 620, respectively. This enables the output of the variable-length coders to be properly sequenced by MPX 621. MPX 621 outputs the sequenced bitstream and overhead codes to buffer 622 for transmission or storage. Motion estimation and compensation circuitry 623 calculates a prediction of the image block input on line 624 based upon various control parameters, the signal from local decoder 625, and the image block signal on line 601. This estimate is added to the incoming image signal via differencing element 602. Motion estimation and compensation circuitry 623 also outputs motion vectors which are incorporated in the overhead information for the layer being encoded by MPX 621.

Since employing a single quantizer and variable-length coder gives rise to the potential of generating run lengths as large as the entire block length in any resolution layer, using smaller VLC tables requires implementing the following additional coding guidelines. For each resolution layer, in addition to the desired number of coefficients, the maximum allowed number of coefficients, which indicates the run/level decoding capability, is specified at the beginning of the video sequence. If, as a result of a long run of zeros, this limit is going to be exceeded, the run is cut and an EOB is sent. The remaining zeros are sent with the next resolution layer. Clearly, inclusion of EOB's in sub-blocks and cutting zero runs will increase the overhead. The increase becomes significant when run/level decoding capability is limited. The actual overhead increase is image dependent, but considerably smaller than the overhead introduced by the previously known method of sending EOBs for each coded block of every scale. The signal output by the encoder of FIG. 6 may be decoded by a decoder similar to that of FIG. 5, but which employs a separate inverse quantizer, inverse scanner, and DMPX/VL decoder for each individual resolution layer.

The above-described invention provides a highly efficient frequency scaling technique wherein the number of coefficients to be included in each subblock is selectable, and a code indicating the number of coefficients within each layer is inserted in the bitstream at the beginning of each encoded video sequence. It will be understood that the particular methods described are only illustrative of the principles of the present invention, and that various modifications could be made by those skilled in the art without departing from the scope and spirit of the present invention, which is limited only by the claims that follow. Such modifications would include encoding and decoding schemes involving more than three resolution layers, or schemes in which, prior to coefficient quantization, the coefficients sent in lower resolution layers are subtracted from the coefficients being sent in higher resolution layers.

We claim:

1. Method for encoding a digital video signal as at least two sets of coefficients, each of said sets containing a selectable number of coefficients and a code indicative of said selectable number, wherein said coefficients within each of said sets comprise a layer corresponding to a particular image resolution scale, and wherein said encoding is performed so that if a last coefficient within any given set of coefficients is zero, and either initiates or falls within a sequence of zero coefficients, representations of the sequence of zero coefficients, and of a first non-zero coefficient following the sequence of zero coefficients, are included in the given set of coefficients.

2. The method of claim 1, wherein if the number of coefficients within a given set of coefficients, comprising a layer corresponding to a lower image resolution scale, exceeds a predetermined maximum as the result of a sequence of contiguous zeros concluding the set, the concluding sequence of contiguous zeros is truncated so that the number of coefficients contained within the given set of coefficients is limited to said predetermined maximum, and the given set of coefficients is concluded with an end of block code.

3. The method of claim 2, wherein zeros truncated from a given set of coefficients are encoded at the beginning of a set of coefficients comprising a layer corresponding to a higher image resolution scale.

4. Apparatus for encoding a digital video signal as at least two sets of coefficients, wherein said encoding is performed so that if a coefficient within any given set of coefficients is zero, and initiates or falls within a sequence of zeros, a representation of the sequence of zeros and a first non-zero coefficient following the sequence of zeros, are included in the set of coefficients, comprising:

means for receiving a digital video input signal including a succession of digital representations related to picture elements of a video image;

means for coding said received digital video input signal to a one-dimensional coefficient sequence;

means for compressing said one-dimensional coefficient sequence to a series of run/level number pairs;

means for variable-length coding said series of run/level number pairs;

means for arranging said series of variable-length coded run/level number pairs into at least two sets, each of said sets consisting of a selectable number of coefficients and comprising a layer corresponding to a particular image resolution scale;

means for generating a code corresponding to each of said sets indicative of the number of coefficients within each of said sets; and means for inserting each of said generated codes within the set of coefficients to which it corresponds.

5. The apparatus of claim 4, wherein said means for arranging said series of variable-length coded run/level number pairs into at least two sets of coefficients is adapted to detect if the number of coefficients within any set of coefficients comprising a layer corresponding to a lower image resolution scale exceeds a predetermined maximum as the result of a contiguous sequence of zero coefficients concluding the given set of coefficients, and upon detecting such a condition reduce the number of contiguous zero coefecents contained within the given set of coefficients to said predetermined maximum by truncating the concluding contiguous sequence of zero coefficients and inserting an end of block code at the termination of the truncated set.

6. The apparatus of claim 5, further comprising a means for inserting the zero coefficients truncated from a given set of coefficients corresponding to a lower image resolution scale at the beginning of a set of coefficients comprising a layer corresponding to a higher image resolution scale.

7. Apparatus for encoding a digital video signal as a multi-layer set of coefficients, wherein said encoding is performed so that if a last coefficient within any given set of coefficients is zero, and initiates or falls within a sequence of zeros, a representation of the sequence of zeros and the first non-zero coefficient following the sequence of zeros, are included in the set of coefficients, comprising:

- means for receiving a digital video input signal including a succession of digital representations related to picture elements of a video image;
- dedicated means for each of said layers adapted to code said received digital video input signal to a one-dimensional coefficient sequence;
- dedicated means for each of said layers adapted to compress said one-dimensional coefficient sequence to a series of run/level number pairs;
- dedicated means for each of said layers adapted to variable-length code said series of run/level number pairs;
- dedicated means for each of said layers adapted to arrange said series of variable-length coded run/level number pairs into a set of coefficients consisting of a selectable number of coefficients and comprising a layer corresponding to a particular image resolution scale;
- dedicated means for each of said layers adapted to generate code indicative of the number of coefficients within each of said set of coefficients; and
- dedicated means for each of said layers adapted to insert each of said generated codes within a corresponding set of coefficients.

8. The apparatus of claim 7, wherein said means adapted to arrange said series of variable-length coded run/level number pairs and dedicated to a layer corresponding to a lower image resolution scale is further adapted to detect if the number of coefficients within a set of coefficients comprising a layer exceeds a predetermined maximum as the result of a contiguous sequence of zero coefficients concluding the set of coefficients, and upon detecting such a condition reduce the number of coefficients contained within the set to said predetermined maximum by truncating the concluding contiguous sequence of zero coefficients and inserting an end of block code at the termination of the truncated set.

9. The apparatus of claim 8, further comprising a means for inserting the coefficients truncated from a given set of coefficients corresponding to a lower image resolution scale at the beginning of a set of coefficients comprising a layer corresponding to a higher image resolution scale.

* * * * *